United States Patent [19]
Ashleigh et al.

[11] Patent Number: 5,528,857
[45] Date of Patent: Jun. 25, 1996

[54] INTEGRAL ROOT BARRIER PANEL AND COMBINATION

[75] Inventors: Frank D. Ashleigh, Baldwin Park; Leonard N. Albrecht, Palm Springs; C. Julian Ray, San Mateo, all of Calif.

[73] Assignee: Deep Root Partners, L.P., Burlingame, Calif.

[21] Appl. No.: 393,287

[22] Filed: Feb. 23, 1995

Related U.S. Application Data

[63] Continuation-in-part of Ser. No. 220,818, Mar. 30, 1994.

[51] Int. Cl.⁶ .................................................. A01G 1/08
[52] U.S. Cl. .................................................. 47/78; 47/33
[58] Field of Search .............................. 47/33, 25, 78 F; 220/4.26; 52/247; 403/364

[56] References Cited

U.S. PATENT DOCUMENTS

| | | | |
|---|---|---|---|
| 1,226,747 | 5/1917 | Bugbee | 220/4.31 |
| 3,291,437 | 12/1966 | Bowden | 220/4.16 |
| 3,462,181 | 8/1969 | Lewis | 403/364 |
| 3,951,294 | 4/1976 | Wilson | 52/245 |
| 4,019,279 | 4/1977 | Moorman et al. | 47/25 |
| 4,665,645 | 5/1987 | Schau, III et al. | 47/25 |
| 5,070,642 | 12/1991 | Albrecht | 47/25 |
| 5,157,869 | 10/1992 | Minton | 220/4.21 |
| 5,168,682 | 12/1992 | Rye | 52/245 |
| 5,301,826 | 4/1994 | Sandahl | 220/4.03 |
| 5,359,809 | 11/1994 | Johnson | 220/4.24 |

FOREIGN PATENT DOCUMENTS

| | | | |
|---|---|---|---|
| 1624218 | 1/1991 | U.S.S.R. | 403/364 |

OTHER PUBLICATIONS

Leonard N. Albrect, U.S. Pat. App., "Method and Apparatus for Deflecting Tree Roots, etc.", S/N 07/905,761, filed Jun. 29, 1992, allowed Dec. 16, 1993.

*Primary Examiner*—Henry E. Raduazo
*Attorney, Agent, or Firm*—Richard L. Gausewitz

[57] ABSTRACT

A set of tree root barrier panels, each of which can be injection-molded as a single integral unit. Each has a female element formed by alternating recessed portions that open in opposite directions relative to each other.

32 Claims, 3 Drawing Sheets

INTEGRAL ROOT BARRIER PANEL AND COMBINATION

CROSS-REFERENCE TO RELATED PATENT APPLICATION

This application is a continuation-in-part of patent application Ser. No. 08/220,818, filed Mar. 30, 1994, for "Integral Root Barrier Panel and Combination".

BACKGROUND OF THE INVENTION

There has long been a major need for a root barrier panel that can be molded in a single piece, that has a male connecting element at one edge and a female connecting element at the opposite edge, that can be manufactured economically and practically by injection molding, and that is such that roots may not grow substantially between panels connected by the male-female elements.

In the absence of the ideal panel indicated in the preceding paragraph, companies in the root barrier industry have had to make do with other things. For example, they have relied on joint strips that had to be separately manufactured and subsequently assembled with the panels. This not only generated increased labor and other costs, but gave rise to the likelihood that there would occasionally be missing or lost strips at the job site.

Another thing that has been proposed and used, because of the long-standing inability to achieve the ideal stated in the first paragraph above, is integral extrusions having integral male joint portions and integral female joint portions. However, extrusions have several major drawbacks. For one thing, it is impossible or impractical to generate extrusions having portions extending transversely to the direction of extrusion. An example is ground locks, which are surfaces that extend substantially horizontally whereas the extruded joints extend vertically (when the panel is in the ground). Reference is made to U.S. Pat. No. 5,070,642 for "Tree Root Deflector Installation". To state another example, it is not possible to have top rails on the extruded panels because such rails also extend transversely to the direction of extrusion. Reference is made to U.S. Pat. No. 5,305,549 for "Method and Apparatus for Deflecting Tree Roots, and Combination of the Apparatus with Tree and Static Structure".

Another of the important problems relative to extrusions is that there are limitations relative to the types of synthetic resin that may be employed. It is frequently not possible or practical to use recycled plastic in extrusions, and this is a substantial environmental and economic consideration.

SUMMARY OF THE INVENTION

Each of a set of identical root barrier panels is integrally formed of synthetic resin, with a male connecting element along one edge and a female connecting element along the other, these elements being shaped and sized to mate sufficiently closely that there will not be significant growth of tree roots therebetween. In the preferred form, each female element has at least one recessed portion that opens in one direction generally perpendicular to the plane of the body of the panel, and at least one other recessed portion that opens in a direction generally perpendicular to such plane and in generally the opposite direction.

The one portion and other portion of the female connecting element are offset from each other longitudinally of the associated panel edge, so that the injection molds may form the recesses in the recessed portions and still open without the need for movable core pins. The molds used in the injection molding include mold cores characterized by the absence of undercuts that prevent opening of the molds in a direction (or directions) transverse to the plane of the body of the panel. The recesses receive different regions of the male connecting element.

In accordance with another aspect of the invention, sections of the female connecting element adjacent at least the top or bottom edge of the panel are not composed of offset recessed portions, but instead of portions that are directly opposite each other and that receive regions of the male connecting element directly between them. These are relatively high-strength sections and are formed by use of short core pins that are movable in the injection molds subsequent to completion of each molding operation. Thus, in accordance with this aspect of the invention, the female connecting element comprises high-strength sections that are molded using movable pins, and less-strength sections that are molded without any need for any movable pins.

In accordance with another aspect, the less-strength and high-strength sections are associated with integral gussets that greatly increase the strength of each.

The recessed portions are shaped as hooks and are adjacent a continuous web. Furthermore, the male connecting element is T-shaped and when in connected relationship is adjacent the web and the hooks. All of the portions fit together in interlocking manner and sufficiently closely to prevent substantial passage of tree roots therebetween.

In accordance with another aspect of the preferred form of the invention, each panel has a horizontal dimension of about two feet and a vertical dimension of at least about twelve inches. Furthermore, ground lock ledges are molded integrally with the panels—being in generally horizontal orientation when the panels are vertically disposed in the ground. Rails are molded horizontally along the top edges of the panels.

In accordance with another aspect of the invention, the male connecting element is tapered at its end regions so as to pass easily into and through the longitudinally aligned portions that form the female connecting element.

In accordance with another aspect of the invention, a connected set of the stated tree root barrier panels is embedded in the ground; a tree is disposed in growing relationship in the ground on one side of the set of panels; and a static structure—such as a sidewalk—is present on the ground on the other side of the set.

In accordance with another aspect of the invention, generally vertical, laterally-spaced root deflectors are provided on the bodies of the panels.

DETAILED DESCRIPTION OF THE PREFERRED EMBODIMENT

U.S. Pat. Nos. 4,019,279 and 5,070,642 are hereby incorporated herein by reference, as is said U.S. Pat. No. 5,305,549.

Figure 1:
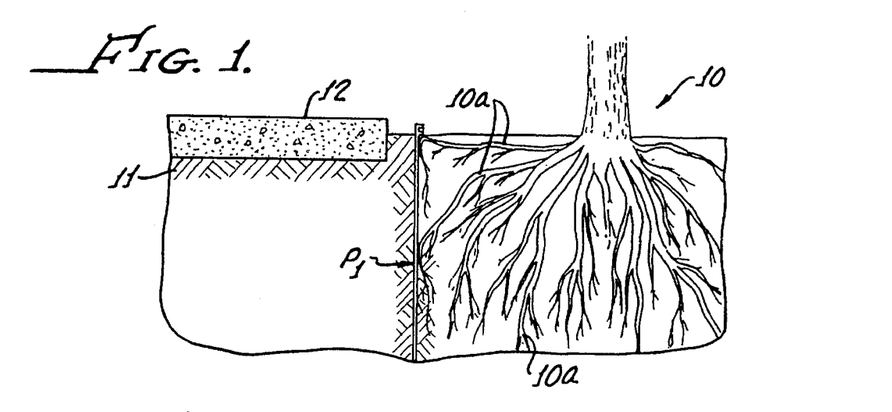
FIG. 1 is a view showing panels relatively adjacent a sidewalk to protect the same from the illustrated roots of a tree.

Referring to FIG. 1, a tree 10 is shown growing in the ground 11 and, in the absence of a root barrier, generates roots 10a that would move, lift, crack or damage a sidewalk 12 or other static structure. A root barrier comprising two or more panels $P_1$ and $P_2$ (FIGS. 2 and 4) is disposed in ground 11 between tree 10 and sidewalk 12 to prevent the roots 10a from harming the sidewalk 12.

$P_1$ and $P_2$ are identical to each other and form a set of identical panels, the set having a desired size and position. There may be, for example, twenty or more panels extending along sidewalk 12, just as there may be more than one tree 10. As another example, the panels, when connected to each other, may be bent in a closed loop so as to encircle one or more of the trees 10.

It would be possible to have panels that are not "identical," but this would be a ridiculous waste of molds, and would still be covered by the appended claims.

Each of the identical panels comprises a somewhat flexible flat body 14 that is preferably rectangular or square, having top and bottom edges 15, 16 that are preferably parallel to each other, and also having left and right edges 17, 18 that are preferably parallel to each other. Body 14 is sufficiently thick that the body will hold its shape and will block tree roots, and sufficiently thin that the panel has substantial flexibility. A typical thickness of body 14 is 0.085 inch. The entire integral panels are preferably formed of polyethylene or polypropylene synthetic resin.

Figure 2:
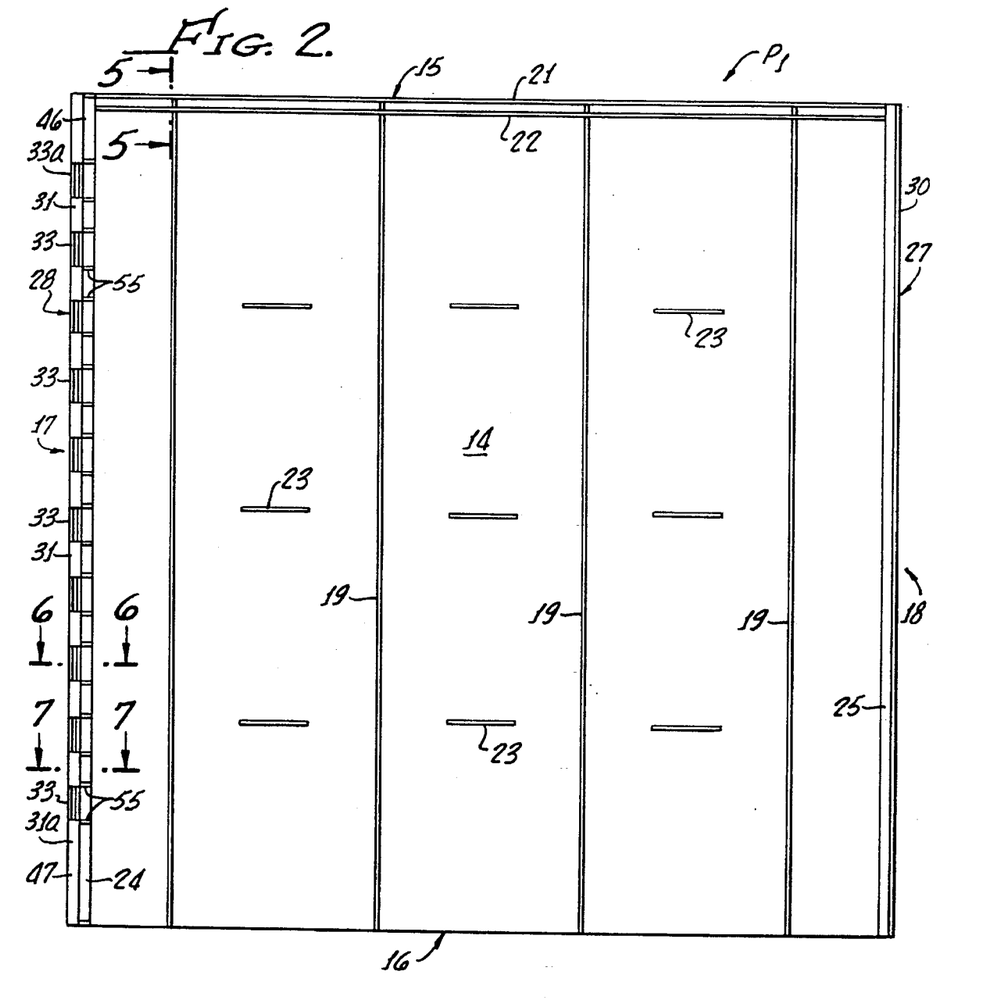
FIG. 2 is a side elevational view of the preferred embodiment of a panel constructed in accordance with the present invention.
Figure 5:
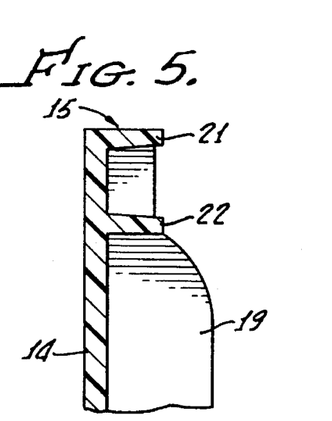
FIGS. 5, 6 and 7 are enlarged fragmentary sectional views on lines 5—5, 6—6, and 7—7 of FIG. 2.

Formed in horizontally spaced relationship on the illustrated side of panel body 14 are several root-deflecting ribs 19 (FIGS. 2 and 5). Each rib extends from about the top edge 15 of the panel to about the bottom edges 16 thereof. Preferably, the ribs project vertically 0.50 inch from the panel body.

Extending along top edge 15 of panel body 14 are vertically spaced horizontal rails 21, 22. The rails are formed on the same side of each panel as the ribs 19.

Ground lock ledges 23 are also formed on the same side of panel body 14, as indicated in FIG. 2.

At a short distance from the right and left edges thereof, panel body 14 jogs in the same direction as the direction of extension of the ribs and rails and ground locks. This increases the number of panels that can be stacked in a given space for shipment or storage. The jogged body portions adjacent left edge 17 and right edge 18 are respectively numbered 24, 25.

The Interlocking Joint Means That Can Be Injection-Molded Integrally with the Panel Body A male connecting element 27 is formed integrally at right edge 18, and a female connecting element 28 is formed integrally at left edge 17. It is to be understood that the locations of the connecting elements 27, 28 may be reversed, the female connection element 28 then being at right edge 18.

The illustrated and preferred male connecting element 27 is a flange 30 that extends forwardly and backwardly at right edge 18. Flange 30 is integral with and preferably perpendicular to jogged portion 25 at right edge 18 and together therewith forms a Tee.

Proceeding next to a description of female connecting element 28, this is (as above stated) capable of being injection-molded in a practical way and prevents significant passage of tree roots therethrough (it being understood that even the roots of large trees are extremely small in diameter when growing at their tips), and is strong so as to be capable of connecting a substantial set or string or chain of panels without substantial danger of breakage of the joints.

Stated generally, one aspect of the preferred female connecting element 28 comprises a recessed portion, the recess of which opens in one direction, and another recessed portion, the recess of which opens in generally the opposite direction. The sizes and positions and directions of opening of the recesses are such that different longitudinally spaced regions of male flange 30 are received in the recessed portions and held thereby.

Figure 6:
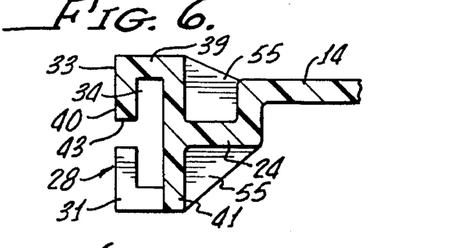

Stated more definitely, and with respect to the preferred embodiment of the invention, there are at least several and preferably a multiplicity of recessed portions 31 (FIGS. 2–4), having recesses or grooves 32 (FIG. 7) that open in one direction. There are also at least several and preferably a multiplicity of recessed portions 33, having recesses or grooves 34 (FIG. 6) that open in a direction opposite to such one direction. As shown in FIGS. 5 and 6, recesses 32 and 34 are located on opposite sides of the plane of jogged portion 24 of panel body 14. With such a relationship, each of the recesses 32, 34 opens in a direction towards such plane. If there were no jog in the panel body, each recess would open toward the plane of the main part of the body 14.

Figure 7:
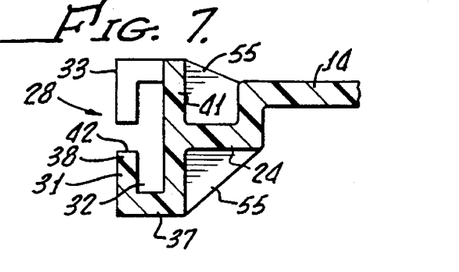

To state the above in another manner, and as shown in FIGS. 6 and 7, each of the recessed portions 31, 33 is J-shaped in horizontal section, with the hook part of each "J" defining the associated recess 32 or 34. Thus, as shown in FIG. 7 relative to each portion 31, the hook part of the "J" has a side flange 37 and an edge flange 38 at right angles to each other, side flange 37 being parallel to the indicated plane. Correspondingly, but on the opposite side of the indicated plane, recessed portion 33 (FIG. 6) has a side flange 39 and an edge flange 40 at right angles to each other, with side flange 39 being parallel to the indicated plane.

The recessed portions 31 and 33 are all integral with each other and with a vertically elongate "bottom" web or flange 41, which is the crossbar of a second Tee. Such crossbar is integral with jogged portion 24 and is wider than the above-described male flange 30.

Bottom web 41 runs continuously from the top of the panel to the bottom thereof and is perpendicular and preferably symmetrical relative to the plane of jogged portion 24. Each side flange 37, 39 is perpendicular to web 41 whereas each edge flange 38, 40 is parallel thereto.

Each edge flange 38, 40 has an extreme edge, numbered 42 and 43, that is parallel to the indicated body plane and is spaced sufficiently far from such plane that it will not obstruct passage of the jogged portion 25 of the male region of a second panel during insertion of flange 30 of such second panel.

The "bottom" web or flange 41 forms, in section as shown in FIGS. 6 and 7, the stem of each of the described J-shaped sections.

The respective side flanges and edge flanges (hooked elements of the J-members) are not symmetrical on opposite side of the indicated plane because they are not directly opposite each other, but are instead disposed in alternating or offset or staggered relationship. The recessed portions 33 on one side of the body plane 36 are disposed just as close to each other as is permitted by tolerances needed for the mold elements employed in the injection molding. The same is true of the recessed portions 31 on the other side of such plane.

The various side flanges 37, 39 and edge flanges 38, 40 are so shaped and spaced as to be capable of being injection-molded without use of movable pins. They are also caused to be such as to cover the maximum amount of flange 30 when it is inserted into the various recessed portions (J-shaped parts) 31, 33 to make a joint between panels $P_1$ and $P_2$ or between any other panels in the set. This maximizes the strength of the joint formed by the alternating or staggered elements, and also aids in substantially preventing tree roots from growing through the joint.

When the male flange 30 is inserted to make a joint, the outer face thereof (extreme right in FIGS. 3, 4 and 8) is adjacent the inner face of bottom web 41, which face is flat. The indicated extreme right (outer) face of the male flange is also flat. This also provides an action aiding in the substantial prevention of passage of tree roots through the joint.

The distance between opposed surfaces of bottom web 41 and edge flanges 38, 40 is caused to be quite small while still permitting insertion of male flange 30 with reasonable force. Likewise, the width of the male flange 30 is so correlated to the distance between the side flanges 37, 39 that the male flange may be inserted without need for excessive force.

The preferred length (vertical dimension) of each recessed portion 31 and each recessed portion 33 is about four inches or less. The optimum length is one inch. The same vertical dimensions apply to the gaps that vertically separate portions 32 from each other, and portions 33 from each other.

As stated above, the various side flanges 37, 39 and edge flanges 38, 40 are so shaped and spaced as to be capable of being injection-molded without use of movable pins. Stated in a somewhat different manner, the male mold elements (cores) that form recesses or grooves 32, 34 are characterized by the absence of undercuts such as would prevent opening of the injection molds in a direction (or directions) transverse or perpendicular to the plane of the panel body 14. Referring, for example, to FIGS. 6–9, inclusive, the male and female mold elements have surfaces that are complementary to the illustrated grooves or recesses and to the illustrated synthetic resin portions. The recesses or grooves are so shaped that the mold elements may open in a direction perpendicular to body 14 after the synthetic resin has hardened sufficiently in the mold cavity. Thus, no undercuts are illustrated in these figures or elsewhere, except relative to the higher strength female strengthening elements next described.

Figure 3:
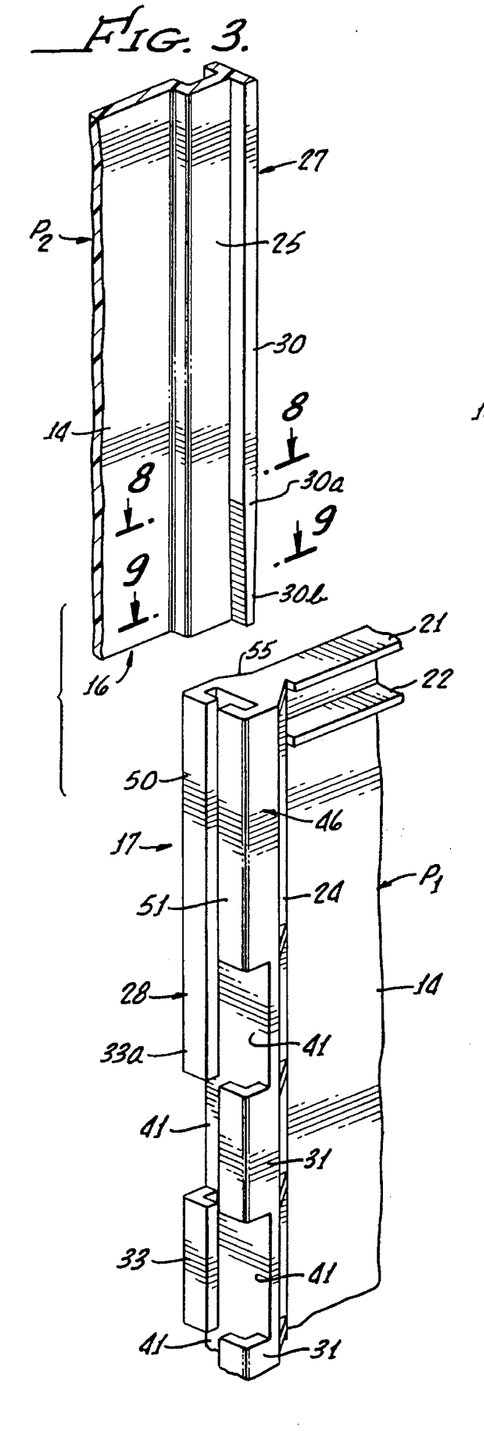
FIG. 3 is an exploded fragmentary isometric view showing the lower end section of the male connecting element and associated panel regions, and further showing the upper end section of the female connecting element and associated panel regions.

In accordance with a second aspect of each female connecting element 28, strengthening elements are provided at at least one and preferably both of the upper and lower regions thereof in order to aid in preventing any opening-type "zipper" action. The upper strengthening element is numbered 46 and the lower strengthening element 47, and each is adjacent one of the recessed portions 31, 33. Stated otherwise, upper strengthening element 46 is adjacent upper recessed member 31 (FIG. 3). Lower strengthening element 47 is adjacent lower recessed member 33 (FIG. 2).

In each strengthening member 46, 47, there are flange portions directly opposite each other on opposite sides of the plane of jogged portion 24. Thus, both such flange portions of each strengthening element cooperate directly with each other in holding in place the male flange 30. Then, when unusual stresses are placed on any joint, such as when it is hit by a shovel or pulled by workers during insertion of a plurality of connected panels into a trench in the ground, there is no likelihood that the joint will break or tear.

Figure 4:
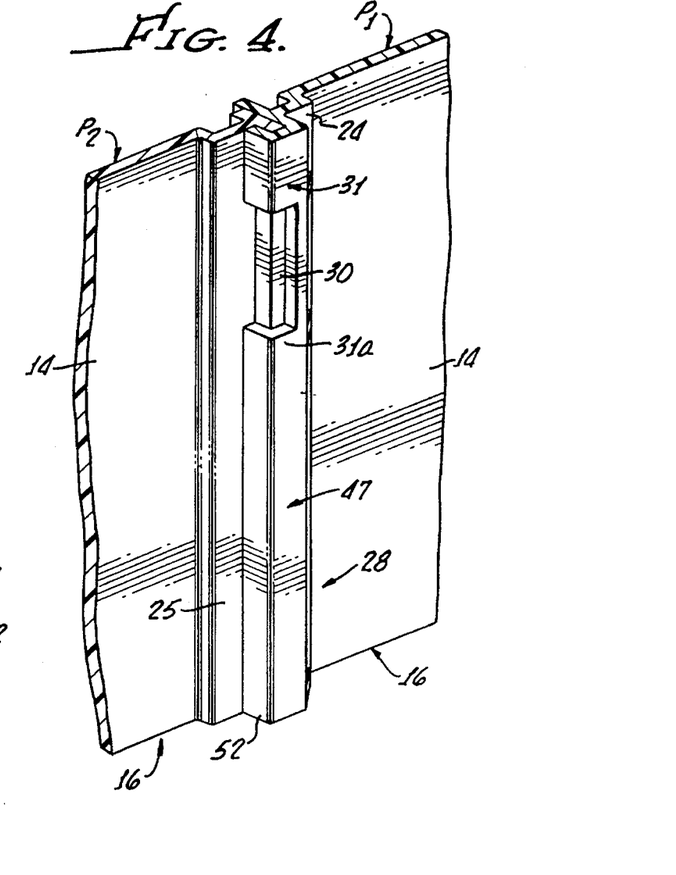
FIG. 4 is a fragmentary isometric view showing the lower end sections of the male and female connecting elements, in assembled condition.

Each strengthening element 46, 47 is injection-molded by means including movable core pins, such pins being relatively short and thus practical to employ. In the illustrated embodiment, upper strengthening element 46 has symmetrical elongate edge flanges 50, 51 which are integral with elongate side flanges (FIG. 3). Similarly, the lower strengthening element 47 has an elongate edge flange 52 that is integral with an elongate side flange (FIG. 4). On the opposite side of the lower element 47 are an edge flange and a side flange that—except for length—are mirror images of the edge flange 52 and associated side flange. Such mirror-image flange elements extend upwardly less far than flange 52 and its associated side flange, so that the latter form at their ends (in effect) the lowermost recessed portion 31*a* (FIGS. 2 and 4). In similar manner, as shown in FIGS. 2 and 3, the lowermost part of edge flange 50 and the associated side flange form (in effect) the uppermost recessed portion 33*a*.

Stated otherwise, the upper and lower strengthening elements are mirror images relative to each other about a horizontal plane between them, except that parts 31*a* and 33*a* are on opposite sides of the plane of the jogged body portion 24.

The upper and lower strengthening elements 46, 47 "blend" with the recessed portions. They are aligned therewith vis-á-vis their flanges, and all can be injection-molded integrally and therefore are so molded.

With the described construction, it is practical to use, in the injection mold apparatus, movable core pins that are sufficiently short that it is practical to move them in and out of the mold cavity by (for example) cam-like means responsive to the opening and closing of the molds. This is to be contrasted with the, for example, hydraulic or pneumatic means which would be required to move long core pins in and out of the mold cavities. Such hydraulically-operated or pneumatically-operated long core pins are not anywhere near as practical or fast-acting as are the short core pins required for the upper and lower strengthening elements 46, 47.

To amplify upon the above, the upper and lower strengthening elements 46, 47 are preferably created by employing mechanically activated side action slides (slide action tooling), which operate automatically in conjunction with the opening and closing of the injection mold. The mold opens in the direction of the opening of the molding machine; the side action slides operate perpendicular to such direction. The side action slides incorporate the movable core pins (movable mold cores) and move them in and out of the mold cavities. An alternative to this would be to use air or hydraulic cylinders to operate slides (and thus core pins). This would add time to the opening and closing of the mold, and would increase production time and cost of manufacturing.

All of the female portions and strengthening elements of each panel, e.g. $P_1$, are aligned with each other and form a vertically elongate and partially interrupted channel which extends all of the way between the top and bottom edges of each panel, and which receives the male flange 30 and jogged body portion 25 of another panel such as P₂ (FIG. 4). The male flange 30 fills in the gaps, or interruptions, as shown in FIG. 4.

In accordance with a third aspect of each female connecting element 28, gussets 55 are molded integrally between web 41 and jogged portion 24 as shown in FIGS. 6, 7, 10 and 11. Such gussets are additional strengthening elements for both the recessed portions (J-shaped members) 31, 33 and strengthening elements 46, 47. The illustrated gussets are present on all recessed portions and strengthening elements, both at the top and bottom of the panel, and at intermediate portions thereof.

Preferably, each strengthening element has a vertical dimension of about two inches, this being optimum. This is to be compared to the one-inch vertical dimension of each of recessed portions 31, 33. Such two-inch optimum length does not include extensions 31a and 33a.

Figure 8:
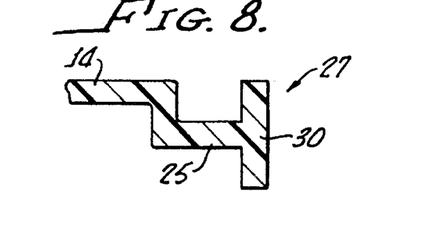
FIGS. 8 and 9 are enlarged fragmentary sectional views on lines 8—8 and 9—9 of FIG. 3.
Figure 9:
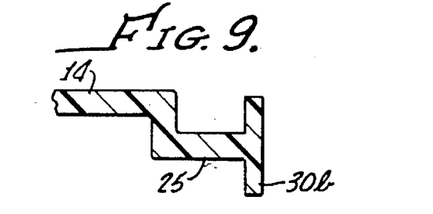
Figure 10:
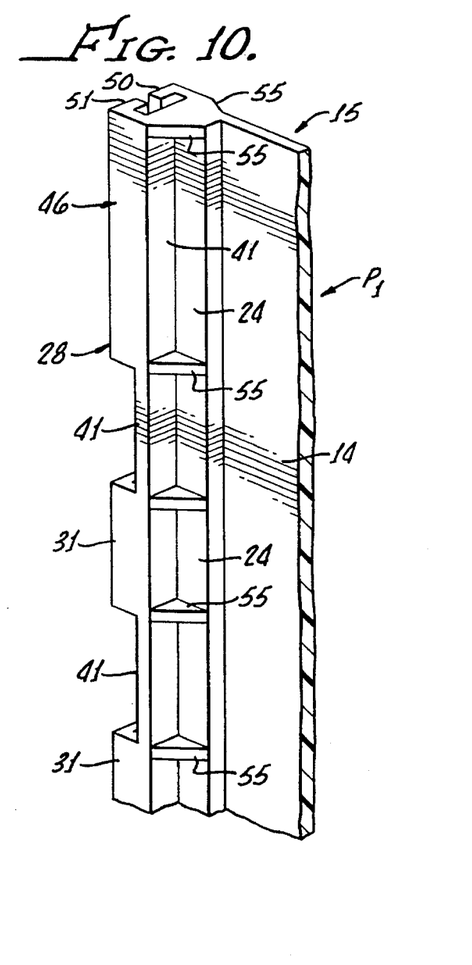
FIGS. 10 and 11 are fragmentary isometric views corresponding to the bottom part of FIG. 3, but as viewed from different angles on both front and back, the top rails being unshown.
Figure 11:
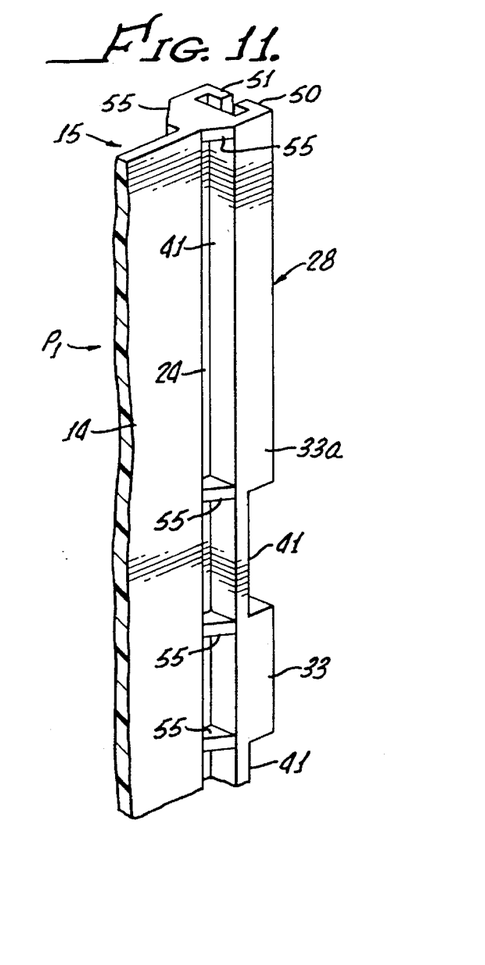

Referring next to FIGS. 3, 8 and 9, the bottom region of male flange 30 is downwardly convergent as illustrated. Thus, in the illustration, the bottom one inch of such flange tapers two degrees on each edge. The same taper is present at the top end of such flange 30, which taper is the mirror image of the one illustrated in FIG. 3.

Not only is there the edge taper as shown, but the opposed faces of flange 30 are, at each end (top and bottom) of such flange, tapered towards each other, as shown in FIG. 3. This taper also extends (in the illustration) for one inch, and is such as to gradually reduce the thickness of flange 30. Sectional views 8 and 9 show, not to scale, the changed cross-section caused by the taper.

Especially because of the described tapers, an end of male flange 30 may be inserted into the upper or lower strengthening element of another panel, in a downward or upward direction, with relative ease. Downward or upward force is then applied to quickly cause the panels to be coextensive with each other so as to have a complete interlocking joint therebetween. During the entire insertion process, the strengthening elements and the various recessed portions are caused to readily receive the tapered flange portions without obstruction. Each joint is relatively tight and is root-resistant, yet each joint can be formed without excessive force.

Operation

Any number of identical panels P₁ and P₂ and others are injection-molded integrally, as described. They are then shipped to a job site, at which a trench is caused to be present, either during initial construction or after root pruning has been effected of the roots 10a of tree 10. The panels are then quickly connected to each other by sequentially causing each separate panel to join another panel by means of the indicated insertion movement. The string of connected panels is disposed in the trench, and backfilling is effected. Alternatively, the panels may be connected to each other while in a trench. The sidewalk 10 is thus protected against roots 10a.

It is emphasized that after each joint is formed as described, portions of flange 30 may be viewed at the openings between adjacent recessed portions 31 or adjacent recessed portions 33. Not only may they be viewed, they "plug" such openings to cooperate in performing the major function of aiding in prevention of substantial root growth through the interlocking joint.

What has been shown and described herein is (as indicated) the optimum or preferred form. Variations—less desirable—may include (for example) causing flange 30 to be asymmetrical relative to jogged portion 25, and causing those parts of female portions 28 on opposite sides of the plane of jogged portion 24 to be asymmetrical relative to each other. In one extreme form, not preferred, the recessed portions are on only one side and have wide edge flanges. The other side has mere "side" flanges (not edge flanges or recesses), that hold the male element 30 in place.

Strength of Joint

It has been described above that the joint between adjacent barriers is strong, one factor being the upper and lower strengthening elements 46, 47. The joint is also strong for other reasons; one is that there are two parts of each joint instead of three (two panels and a separate joint strip). The present panels and joints, being injection-molded, can be made of strong synthetic resin; this is to be contrasted with some separate joint strips which are soft and weak extrusions.

The foregoing detailed description is to be clearly understood as given by way of illustration and example only, the spirit and scope of this invention being limited solely by the appended claims.

What is claimed is:

1. A set of at least two tree root-barrier panels that can each be integrally injection-molded, said set comprising:

(a) two generally square or rectangular bodies that are substantially identical to each other,
each body having a right edge and a left edge,
each body having a top edge and a bottom edge,
each body being molded of synthetic resin,
each body being sufficiently thick to block tree roots, (b) male connecting means provided on said right edge of each body and extending therealong; and (c) female connecting means provided on a major portion of said left edge of each body and extending therealong,
said female connecting means being shaped to receive said male connecting means in interlocking relationship whereby to join said two tree root-barrier panels together along said left and right edges thereof,
said female connecting means having at least one recessed portion thereof that is shaped to receive part of said male connecting means,
said female connecting means having another portion positioned to hold said male connecting means in said one recessed portion,
said female connecting means having opening means therein that opens in a direction generally transverse to said body and through which mold means may be removed from said one recessed portion, in a direction generally transverse to said body, during injection molding of each panel,
said mold means being the male mold cores employed in injection-molding said one recessed portion, there being no substantial undercuts preventing said removal of said mold means from said one recessed portion in said direction generally transverse to said body,
all of said male connecting means being on said right edge,
all of said female connecting means being on said left edge,
said male connecting means and said female connecting means being so shaped and related that said interlocking relationship is achieved by movement of adjacent ones of said panels in a direction relative to each other that is substantially vertical when (1) said adjacent panels are in a vertical plane, and (2) said bottom edges of said bodies of said adjacent panels are substantially horizontal, and (3) said right edge and said left edge of said bodies of said adjacent panels are both substantially vertical.

2. A set of at least two tree root-barrier panels that can each be integrally injection-molded, said set comprising:

(a) two generally square or rectangular bodies that are substantially identical to each other,
each of said bodies having a right edge and a left edge,
each of said bodies having a top edge and a bottom edge,
each of said bodies being molded of synthetic resin,
each of said bodies being sufficiently thick to block tree roots, (b) male connecting means provided on said right edge of each of said bodies and extending therealong; and (c) female connecting means provided on said left edge of each of said bodies and extending therealong,
said female connecting means being shaped to receive said male connecting means in interlocking relationship whereby to join said two tree root-barrier panels together along said left and right edges thereof,
said female connecting means having at least one recessed portion thereof that is shaped to receive part of said male connecting means and that opens in a direction generally transverse to said body,
said female connecting means having another portion positioned to hold said male connecting means in said one portion,
said female connecting means having opening means therein through which mold elements may be removed, in a direction transverse to said left edge, during molding of each panel, and in which in each of said panels there are at least several of said one portions and at least several of said another portions, said one portions and said another portions in each panel cooperating with each other to hold one of said male connecting means securely in joined condition with one of said female connecting means,
all of said male connecting means being on said right edge,
all of said female connecting means being on said left edge,
said male connecting means and said female connecting means being so shaped and related that said interlocking relationship is achieved by movement of adjacent ones of said panels in a direction relative to each other that is substantially vertical when (1) said adjacent panels are in a vertical plane, and (2) said bottom edges of said bodies of said adjacent panels are substantially horizontal, and (3) said right edge and said left edge of said bodies of said adjacent panels are both substantially vertical.

3. The invention as claimed in claim 1, in which said one portion and said another portion are associated with each other and with said male connecting means in interlocking relationship and in such manner as to prevent substantial tree root growth between the joined panels.

4. The invention as claimed in claim 1, in which each of said panels has a horizontal dimension of about two feet and a vertical dimension of at least about twelve inches.

5. A set of at least two tree root-barrier panels that can each be integrally injection-molded, said set comprising:

(a) two generally square or rectangular bodies that are substantially identical to each other,
each of said bodies having a right edge and a left edge,
each of said bodies having a top edge and a bottom edge,
each of said bodies being molded of synthetic resin,
each of said bodies being sufficiently thick to block tree roots, (b) male connecting means provided on said right edge of each of said bodies and extending therealong; and (c) female connecting means provided on said left edge of each of said bodies and extending therealong,
said female connecting means being shaped to receive said male connecting means in interlocking relationship whereby to join said two tree root-barrier panels together along said left and right edges thereof,
said female connecting means having at least one recessed portion thereof that is shaped to receive part of said male connecting means and that opens in a direction generally transverse to said body,
said female connecting means having another portion positioned to hold said male connecting means in said one portion,
said female connecting means having opening means therein through which mold elements may be removed, in a direction transverse to said left edge, during molding of each panel, and
said female connecting means having, at a location adjacent at least one of said top edge and said bottom edge a third portion that is recessed and a fourth portion that is recessed, and that open in generally opposite directions relative to each other, said third and fourth recessed portions receiving, and strongly holding directly between them, parts of said male connecting means.

6. The invention as claimed in claim 1, in which at least two of said tree root-barrier panels are joined at said male and female connecting means and are embedded in the ground, in which a growing tree is present in the ground on one side of and relatively near said joined panels, and in which a static structure is present in the ground on the opposite side of said joined panels from said tree.

7. The invention as claimed in claim 6, in which said panels have generally vertical, laterally-spaced root deflectors provided on said bodies.

8. A set of at least two tree root-barrier panels that can each be integrally injection-molded, said set comprising:

(a) two generally square or rectangular bodies that are substantially identical to each other,
each of said bodies having a right edge and a left edge,
each of said bodies having a top edge and a bottom edge,
each of said bodies being molded of synthetic resin,
each of said bodies being sufficiently thick to block tree roots, (b) male connecting means provided on said right edge of each of said bodies and extending therealong; and (c) female connecting means provided on said left edge of each of said bodies and extending therealong,
said female connecting means being shaped to receive said male connecting means in interlocking relationship whereby to join said two tree root-barrier panels together along said left and right edges thereof,
said female connecting means having at least one recessed portion thereof that is shaped to receive part of said male connecting means and that opens in a direction generally transverse to said body,
said female connecting means having another portion positioned to hold said male connecting means in said one portion, said female connecting means having opening means therein through which mold elements may be removed, in a direction transverse to said left edge, during molding of each panel, in which at least two of said tree-root barrier panels are joined at said male and female connecting means and are embedded in the ground, in which a tree is present in the ground on one side of and relatively near said joined panels, and in which a static structure is present on the ground on the opposite side of said joined panels from said tree, and in which each of said panels has ground lock ledges included integrally thereon in generally horizontal relationship, all of said male connecting means being on said right edge, all of said female connecting means being on said left edge, said male connecting means and said female connecting means being so shaped and related that said interlocking relationship is achieved by movement of adjacent ones of said panels in a direction relative to each other that is substantially vertical when (1) said adjacent panels are in a vertical plane, and (2) said bottom edges of said bodies of said adjacent panels are substantially horizontal, and (3) said right edge and said left edge of said bodies of said adjacent panels are both substantially vertical.

9. A set of at least two tree root-barrier panels that can each be integrally injection-molded, said set comprising:

(a) two generally square or rectangular bodies that are substantially identical to each other, each of said bodies having a right edge and a left edge, each of said bodies having a top edge and a bottom edge, each of said bodies being molded of synthetic resin, each of said bodies being sufficiently thick to block tree roots, (b) male connecting means provided on said right edge of each of said bodies and extending therealong; and (c) female connecting means provided on said left edge of each of said bodies and extending therealong, said female connecting means being shaped to receive said male connecting means in interlocking relationship whereby to join said two tree root-barrier panels together along said left and right edges thereof, said female connecting means having at least one recessed portion thereof that is shaped to receive part of said male connecting means and that opens in a direction generally transverse to said body, said female connecting means having another portion positioned to hold said male connecting means in said one portion, said female connecting means having opening means therein through which mold elements may be removed, in a direction transverse to said left edge, during molding of each panel, in which at least two of said tree-root barrier panels are joined at said male and female connecting means and are embedded in the ground, in which a tree is present in the ground on one side of and relatively near said joined panels, and in which a static structure is present on the ground on the opposite side of said joined panels from said tree, and in which said panels have rails molded horizontally along said top edges generally parallel to said top edges, all of said male connecting means being on said right edge, all of said female connecting means being on said left edge, said male connecting means and said female connecting means being so shaped and related that said interlocking relationship is achieved by movement of adjacent ones of said panels in a direction relative to each other that is substantially vertical when (1) said adjacent panels are in a vertical plane, and (2) said bottom edges of said bodies of said adjacent panels are substantially horizontal, and (3) said right edge and said left edge of said bodies of said adjacent panels of said bodies of said adjacent panels are both substantially vertical.

10. A tree root-barrier panel, comprising:

(a) a generally rectangular or square solid panel body formed of synthetic resin and having a size of at least about a foot on each side, said body being flat and having parallel front and back surfaces that are sufficiently far from each other that said body is self-supporting and will block and deflect tree roots, and that are sufficiently close together that said body has substantial flexibility so that it may be readily bent into arcuate shape, said body having generally parallel top and bottom edges, and generally parallel right and left edges that are transverse to said top and bottom edges;

(b) root deflectors provided on said body in spaced relationship from each other, and transverse to said top and bottom edges;

(c) means formed integrally on said right edge of said body and forming a male joint member; and (d) a plurality of hooks formed integrally on said left edge of said body and forming a female joint member adapted to receive and join with a male joint member that is identical to said above-recited male joint member, some of said hooks having groove portions that open in a direction generally perpendicular to the plane of said body in one direction from said plane, said groove portions being shaped to be injection-molded by male mold means that do not have substantial undercuts preventing removal of said male mold means from said groove portions in said direction generally perpendicular to the plane of said body in said one direction from said plane.

11. The invention as claimed in claim 10 in which other of said hooks have other groove portions that open in a direction generally perpendicular to said plane of said body in a direction generally opposite to said one direction, said other portions being shaped to be injection-molded by male mold means that do not have substantial undercuts preventing removal of said male mold means from said other groove portions in said direction generally perpendicular to said plane of said body in said direction generally opposite to said one direction.

12. A tree root-barrier panel, comprising:

(a) a generally rectangular or square solid panel body formed of synthetic resin and having a size of over a foot on each side, said body being flat and having parallel front and back surfaces that are sufficiently far from each other that said body is self-supporting and will block and deflect tree roots, and that are sufficiently close together that said body has substantial flexibility so that it may be readily bent into arcuate shape, said body having generally parallel top and bottom edges, and generally parallel right and left edges that are transverse to said top and bottom edges;

(b) root deflectors provided on said body in spaced relationship from each other, and transverse to said top and bottom edges;

(c) means formed integrally on said right edge of said body and forming a male joint member; and (d) a plurality of hooks formed integrally on said left edge of said body and forming a female joint member adapted to receive and join with a male joint member that is identical to said above-recited male joint member, some of said hooks having groove portions that open in a direction generally perpendicular to the plane of said body in one direction from said plane, other of said hooks having other groove portions that open in a direction generally perpendicular to said plane of said body in a direction generally opposite to said one direction, and in which said some of said hooks and said other of said hooks are offset from each other longitudinally of said left edge.

13. A tree root-barrier panel, comprising:

(a) a generally rectangular or square solid panel body formed of synthetic resin and having a size of over a foot on each side, said body being flat and having parallel front and back surfaces that are sufficiently far from each other that said body is self-supporting and will block and deflect tree roots, and that are sufficiently close together that said body has substantial flexibility so that it may be readily bent into arcuate shape, said body having generally parallel top and bottom edges, and generally parallel right and left edges that are transverse to said top and bottom edges;

(b) root deflectors provided on said body in spaced relationship from each other, and transverse to said top and bottom edges;

(c) means formed integrally on said right edge of said body and forming a male joint member; and (d) a plurality of hooks formed integrally on said left edge of said body and forming a female joint member adapted to receive and join with a male joint member that is identical to said above-recited male joint member, some of said hooks having groove portions that open in a direction generally perpendicular to the plane of said body in one direction from said plane, other of said hooks having other groove portions that open in a direction generally perpendicular to said plane of said body in a direction generally opposite to said one direction, in which said some of said hooks and said other of said hooks are offset from each other longitudinally of said left edge, and in which said some of said hooks and said other of said hooks alternate with each other along said left edge, and have portions that are adapted to be close to said male joint member of a panel identical to said panel for prevention of tree root growth therebetween.

14. The invention as claimed in claim 12, in which said male joint member is a substantially continuous flange extending forwardly and backwardly from said right edge.

15. The invention as claimed in claim 10, in which said male joint member is tapered at at least one end, so as to pass easily into said female joint member of another and identical panel in a direction parallel to said left edge.

16. The invention as claimed in claim 12, in which at at least one end of said female joint member there are not offset hooks but instead joint-forming portions that are directly opposite each other for forming high-strength female joint elements.

17. The invention as claimed in claim 10, in which gussets are provided integrally with said hooks to strengthen the same.

18. The invention as claimed in claim 12, in which at each end of said female joint member there are not offset hooks but instead joint-forming portions that are directly opposite each other for forming high-strength female joint elements.

19. A set of at least two tree root-barrier panels that are each injection-molded, and formed of synthetic resin, said set comprising:

(a) two generally planar bodies that are substantially identical to each other, each of said bodies having a top edge and a bottom edge, each of said bodies being injection-molded of synthetic resin, each of said bodies being sufficiently thick to block tree roots, each of said bodies having a right edge and a left edge;

(b) male connecting means provided on said right edge of each of said bodies and extending therealong; and (c) female connecting means provided on said left edge of each of said bodies integrally therewith and extending therealong, each of said female connecting means being shaped to receive one of said male connecting means in interlocking relationship whereby to join said two tree root-barrier panels together along left and right edges thereof, each of said female connecting means having at least one recessed portion thereof that opens in one direction generally perpendicular to the plane of said body, and having at least one other recessed portion thereof that opens in a direction generally perpendicular to the plane of said body that is generally opposite to said one direction, said one portion and said other portion of each of said female connecting means being offset from each other longitudinally of the associated left edge of said body, said one portion and said other portion of each of said female connecting means being shaped to receive one of said male connecting means, all of said male connecting means being on said right edge, all of said female connecting means being on said left edge, said male connecting means and said female connecting means being so shaped and related that said interlocking relationship is achieved by movement of adjacent ones of said panels in a direction relative to each other that is substantially vertical when (1) said adjacent panels are in a vertical plane, and (2) said bottom edges of said adjacent panels are substantially horizontal, and (3) said right edge and said left edge are both substantially vertical.

20. The invention as claimed in claim 19, in which two of said tree root-barrier panels are connected to each other at said male and female connecting means and are embedded in the ground, in which a tree is present in the ground on one side of and relatively near said panels, and in which a static structure is present in the ground on the opposite side of said panels from said tree.

21. A set of synthetic resin root control panels for placement in the ground, said set comprising:

(a) at least two root control panels each having top, bottom, left and right edges, (b) a male joint element provided along said right edge of each panel, and (c) a female joint element provided along said left edge of each panel, each of said female joint elements being shaped to mate with each of said male joint elements in interlocking relationship to form between two of said panels a joint that is resistant to being pulled apart, each of said female joint elements not being continuous along the length of said left edge but instead having a plurality of sections that are spaced from each other, all of said male joint element being on said right edge, all of said female joint element being on said left edge, said male joint element and said female joint element being so shaped and related that said interlocking relationship is achieved by movement of adjacent ones of said panels in a direction relative to each other that is substantially vertical when (1) said adjacent panels are in a vertical plane, and (2) said bottom edges of said adjacent panels are substantially horizontal, and (3) said right edge and said left edge of said adjacent panels are both substantially vertical.

22. The invention as claimed in claim 21 in which each of said male joint elements and each of said female joint elements are so shaped that when said male and female joint elements are in mated condition, a substantially continuous joint is created for blocking growth of tree roots through said joint.

23. The invention as claimed in claim 21, in which a plurality of said panels mated at said joint elements is embedded in the ground between a tree and a static structure.

24. The invention as claimed in claim 22, in which a plurality of said panels mated at said joint elements is embedded in the ground between a growing tree and a static structure.

25. The invention as claimed in claim 21, in which each of said male joint elements is integrally molded with its associated panel, and each of said female joint elements is integrally molded with its associated panel.

26. The invention as claimed in claim 22, in which each of said male joint elements is integrally molded with its associated panel, and each of said female joint elements is integrally molded with its associated panel.

27. The invention as claimed in claim 25, in which each of said male joint elements and each of said female joints are so shaped that when in mated condition, the joint between adjacent panels is a strong interlocking joint that is highly resistant to being pulled apart by a force applied transversely to said joint.

28. A set of synthetic resin root control panels for placement in the ground, said set comprising:

(a) at least two root control panels each having top, bottom, left and right edges, (b) a male joint element provided along said right edge of each panel, and (c) a female joint element provided along said left edge of each panel, each of said female joint elements being shaped to mate with each of said male joint elements to form between two of said panels a joint that is resistant to being pulled apart, each of said female joint elements not being continuous along the length of said left edge but instead having a plurality of sections that are spaced from each other, each of said female joint elements being shaped with hook portions respectively separated by gaps, said hook portions being shaped to receive said male joint element.

29. A set of synthetic resin root control panels for placement in the ground, said set comprising:

(a) at least two root control panels each having top, bottom, left and right edges, (b) a male joint element provided along said right edge of each panel, and (c) a female joint element provided along said left edge of each panel, each of said female joint elements being shaped to mate with each of said male joint elements to form between two of said panels a joint that is resistant to being pulled apart, each of said female joint elements not being continuous along the length of said left edge but instead having a plurality of sections that are spaced from each other, each of said female joint elements being shaped with alternating hook portions that open in generally opposite directions relative to each other, said alternating hook portions being shaped to receive said male joint element.

30. The invention as claimed in claim 29, in which each of said female joint elements also has hook portions that are not alternating but are directly opposite each other and that are adjacent at least one of said top and bottom edges, said last-mentioned hook portions and said alternating hook portions all simultaneously receiving one of said male joint elements.

31. The invention as claimed in claim 29, in which each of said male joint elements is shaped to fill openings in said alternating hook portions.

32. A set of synthetic resin root control panels for placement in the ground, said set comprising:

(a) at least two root control panels each having top, bottom, left and right edges, (b) a male joint element provided along said right edge of each panel, (c) a female joint element provided along said left edge of each panel, each of said female joint elements being shaped to mate with each of said male joint elements to form between two of said panels a joint that is resistant to being pulled apart, each of said female joint elements not being continuous along the length of said left edge but instead having a plurality of sections that are spaced from each other, and (d) gussets provided to strengthen said female joint elements.

* * * * *